(12) United States Patent  
Naito et al.

(10) Patent No.: US 12,323,020 B2
(45) Date of Patent: Jun. 3, 2025

(54) BRUSHLESS MOTOR

(71) Applicant: Murata Manufacturing Co., Ltd., Nagaokakyo (JP)

(72) Inventors: Osamu Naito, Nagaokakyo (JP); Miyuki Furuya, Hamamatsu (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 259 days.

(21) Appl. No.: 18/087,326

(22) Filed: Dec. 22, 2022

(65) Prior Publication Data

US 2023/0130413 A1 Apr. 27, 2023

Related U.S. Application Data

(63) Continuation of application No. PCT/JP2021/024719, filed on Jun. 30, 2021.

(30) Foreign Application Priority Data

Oct. 1, 2020 (JP) .................. 2020-166697

(51) Int. Cl.
  *H02K 1/27* (2022.01)
  *H02K 1/2706* (2022.01)
  (Continued)

(52) U.S. Cl.
  CPC ........... *H02K 29/00* (2013.01); *H02K 1/2706* (2013.01); *H02K 7/09* (2013.01)

(58) Field of Classification Search
  CPC .. H02K 5/1675; H02K 15/03; H02K 2205/03; F16C 17/08
  (Continued)

(56) References Cited

U.S. PATENT DOCUMENTS 6,172,847 B1 1/2001 Sakatani et al.
7,913,268 B2 * 3/2011 Yasumoto .......... G11B 17/0282
  310/67 R
(Continued)

FOREIGN PATENT DOCUMENTS

JP H0523782 U * 3/1993
JP H11275806 A 10/1999
(Continued)

OTHER PUBLICATIONS

JP-2005168264-A—Machine Translation (Year: 2005).*
(Continued)

*Primary Examiner* — Tran N Nguyen
*Assistant Examiner* — Masoud Vaziri
(74) *Attorney, Agent, or Firm* — ArentFox Schiff LLP

(57) ABSTRACT

A brushless motor is provided that includes a rotor, a stator, a bearing member, an attraction magnet, and a yoke. The rotor includes a shaft, a rotor yoke that holds the shaft and covers a peripheral surface of the shaft, and a magnet disposed around an outer periphery of the rotor yoke. The stator is disposed around an outer periphery of the rotor. An inner wall of a housing serving as a bearing member rotatably holds the shaft with a bearing. The attraction magnet is disposed at an end portion of the inner wall at which the rotor yoke holds the shaft, and produces an attraction force to attract the rotor yoke. The yoke supplements and enhances the attraction force produced by the attraction magnet.

18 Claims, 5 Drawing Sheets

(51) Int. Cl.
 *H02K 7/09* (2006.01)
 *H02K 29/00* (2006.01)
(58) Field of Classification Search
 USPC .......................................................... 310/67 R
 See application file for complete search history.

(56) References Cited

U.S. PATENT DOCUMENTS

| | | | | |
|---|---|---|---|---|
| 2002/0113503 | A1* | 8/2002 | Nagatsuka | H02K 5/1675 |
| | | | | 310/67 R |
| 2004/0176261 | A1* | 9/2004 | Tojou | F16C 17/045 |
| | | | | 508/486 |
| 2004/0189122 | A1* | 9/2004 | Obata | F16C 33/107 |
| | | | | 310/90 |
| 2008/0164776 | A1* | 7/2008 | Yoshimatsu | H02K 5/1675 |
| | | | | 310/90.5 |
| 2016/0065017 | A1* | 3/2016 | Amagi | H02K 29/03 |
| | | | | 310/49.55 |
| 2021/0135530 | A1* | 5/2021 | Yoneoka | H02K 3/522 |

FOREIGN PATENT DOCUMENTS

| | | | |
|---|---|---|---|
| JP | 2001157407 | A * | 6/2001 |
| JP | 2005168264 | A * | 6/2005 |
| JP | 2007318985 | A | 12/2007 |

OTHER PUBLICATIONS

JP-2001157407-A—Machine Translation (Year: 2001).*
JP-H0523782-U Machine Translation (Year: 1993).*
International Search Report in PCT/JP2021/024719, mailed Sep. 14, 2021, 3 pages.

* cited by examiner

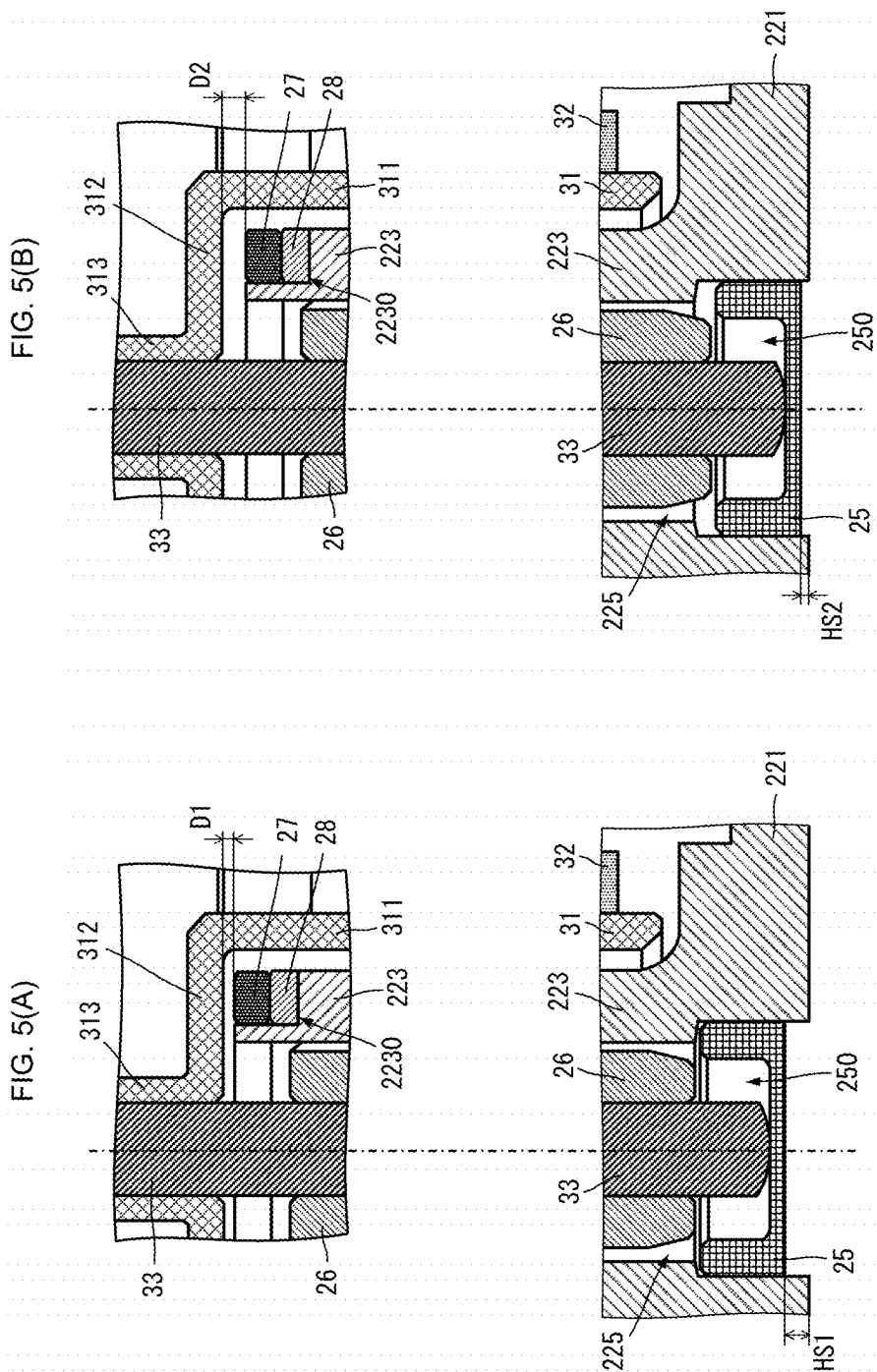

BRUSHLESS MOTOR

CROSS REFERENCE TO RELATED APPLICATIONS

This application is a continuation of PCT Application No. PCT/JP2021/024719, filed Jun. 30, 2021, which claims priority to Japanese Patent Application No. 2020-166697, filed Oct. 1, 2020, the entire contents of each of which are hereby incorporated by reference in their entirety.

TECHNICAL FIELD

The present invention relates to a single-shaft brushless motor.

BACKGROUND

Japanese Patent Application Publication No. 2001-157407 (hereinafter "Patent Document 1") describes a single-shaft brushless motor. The brushless motor described in Patent Document 1 includes a rotor, a stator, and a preload adjustment mechanism.

The preload adjustment mechanism includes a mechanism that slides with a helicoid. When a sliding ball is worn away after use, a bottom plate that supports a shaft is screwed in to adjust the preload adjustment mechanism and correct the position of the shaft.

However, when, for example, a fan is to be rotated, a large force (e.g., a thrust force) is used to pull the rotor away from the stator, and thus, a known structure as described in Patent Document 1 may fail to prevent a thrusting motion of the rotor.

SUMMARY OF THE INVENTION

Thus, according to an exemplary aspect of the present invention, a brushless motor is provided that is configured to reliably prevent a thrusting motion of a rotor regardless of a large thrust force.

In an exemplary aspect, a brushless motor is provided that includes a rotor, a stator, a bearing member, an attraction force producing member, and an attraction-force supplementary member. The rotor includes a shaft, a rotor yoke that holds the shaft and covers the peripheral surface of the shaft, and a permanent magnet disposed around the outer periphery of the rotor yoke. The stator is disposed around the outer periphery of the rotor. Moreover, the bearing member rotatably holds the shaft. The attraction-force producing member is disposed at an end portion of the bearing member at which the rotor yoke holds the shaft, and is configured to produce an attraction force to attract the rotor yoke. The attraction-force supplementary member additionally supplies an attraction force.

This structure enhance an attraction force to attract the rotor yoke. Thus, according to the exemplary aspect of the present invention, thrusting motions of a rotor are more reliably prevented.

BRIEF DESCRIPTION OF DRAWINGS

FIG. 5(A) and FIG. 5(B) are enlarged views of a portion around the rotor 30 and a stator 40.

DETAILED DESCRIPTION OF EMBODIMENTS

A brushless motor, a stator assy, and a method for manufacturing the brushless motor and the stator assy according to an exemplary embodiment of the present invention will be described with reference to the drawings.

Figure 1:
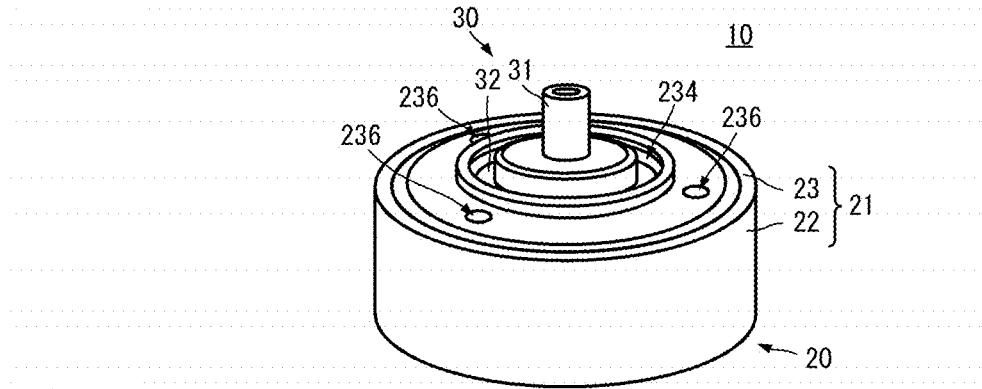
FIG. 1 is an external perspective view of a brushless motor 10 according to an exemplary embodiment.
Figure 2:
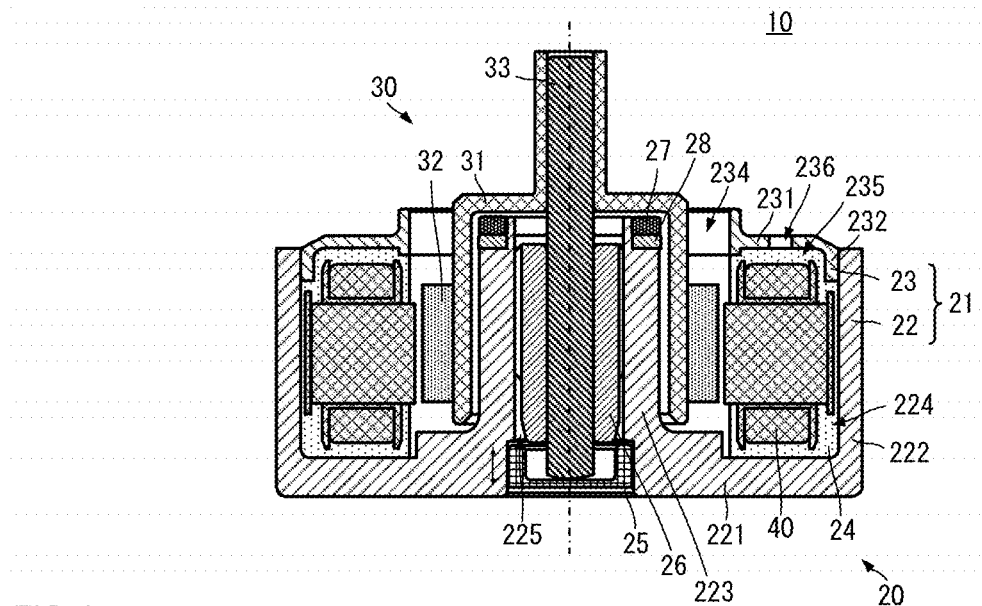
FIG. 2 is a sectional view, viewed from a side, of a structure of the brushless motor 10 according to the exemplary embodiment.
Figure 3:
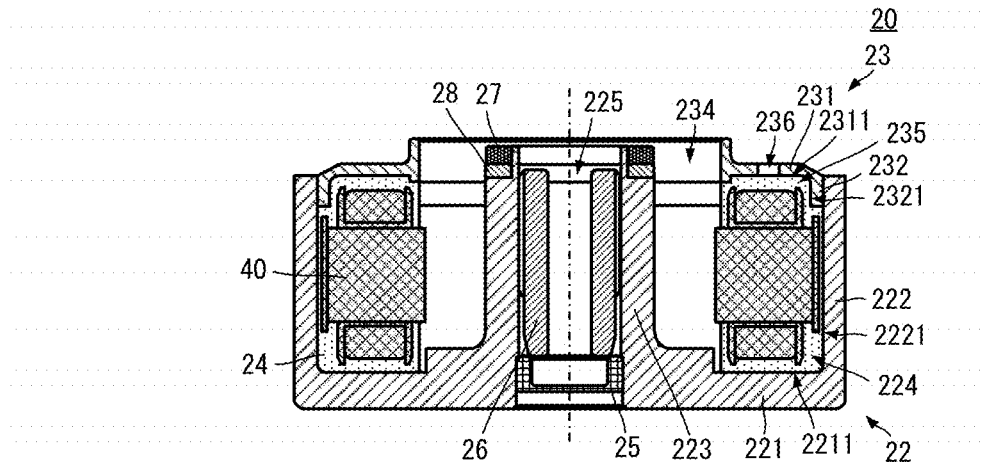
FIG. 3 is a sectional view, viewed from a side, of a structure of a stator assy 20 according to the exemplary embodiment.
Figure 4A:
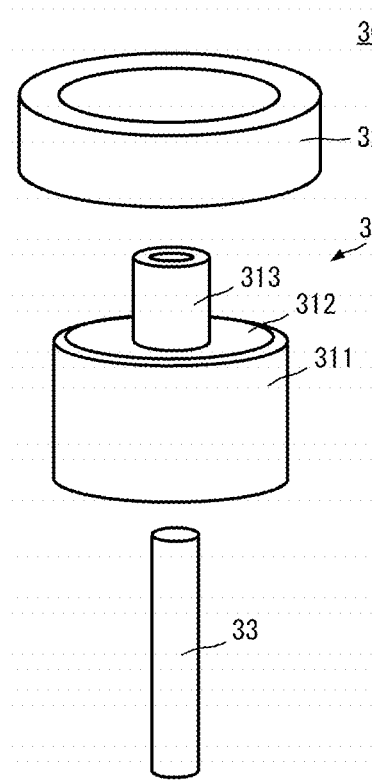
FIG. 4(A) is an exploded perspective view of a rotor 30.
Figure 4B:
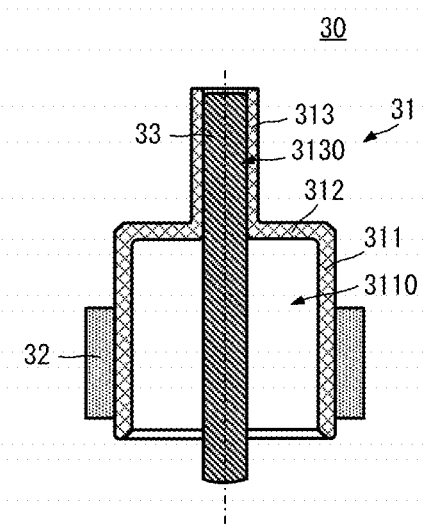
FIG. 4(B) is a sectional view, viewed from a side, of a structure of the rotor 30.

FIG. 1 is an external perspective view of a brushless motor 10 according to an exemplary embodiment. FIG. 2 is a sectional view, viewed from a side, of a structure of the brushless motor 10 according to the exemplary embodiment. FIG. 3 is a sectional view, viewed from a side, of a structure of a stator assy 20 according to the exemplary embodiment. FIG. 4(A) is an exploded perspective view of a rotor 30, and FIG. 4(B) is a sectional view, viewed from a side, of a structure of the rotor 30.

Schematic Structure of Brushless Motor 10

As illustrated in FIG. 1 and FIG. 2, the brushless motor 10 includes a stator assy 20 and a rotor 30. The specific structures of the stator assy 20 and the rotor 30 will be described below.

In general, the stator assy 20 has an opening 234. The rotor 30 is inserted into the stator assy 20 through the opening 234. When the brushless motor 10 (i.e., the stator assy 20) is viewed in a plan, the opening 234 overlaps a center space in a stator 40. Thus, the rotor 30 is disposed on the inner side of the stator 40. In other words, the stator 40 is disposed around the outer periphery of the rotor 30.

A first end portion of the rotor 30 from which a shaft 33 extends protrudes outward from the opening 234 of the stator assy 20. A second end portion of the rotor 30 opposite to the end portion from which the shaft 33 extends is rotatably supported by the stator assy 20.

This structure is provided to control signals provided to the stator 40 to control rotations of the rotor 30. Thus, the brushless motor 10 is embodied as an inner-rotor-type single-shaft brushless motor.

Specific Structure of Stator Assy 20

As illustrated in FIG. 1, FIG. 2, and FIG. 3, the stator assy 20 includes a housing 21, an insulating resin 24, a shaft cap member 25, a bearing 26, an attraction magnet 27, a yoke 28, and a stator 40.

The housing 21 includes a first housing member 22 and a second housing member 23. The first housing member 22 and the second housing member 23 can be formed from a highly stiff material, such as SUS, according to an exemplary aspect.

As further shown, the first housing member 22 includes a main wall 221, a side wall 222, and an inner wall 223. The main wall 221 is circular in a plan view. The side wall 222 is cylindrical, is disposed along the outer peripheral end portion of the main wall 221, and extends in a direction perpendicular to the main surface of the main wall 221.

The inner wall 223 is cylindrical, is disposed at the center of the main wall 221, and extends in a direction perpendicular to the main surface of the main wall 221. The inner wall 223 includes a hollow portion 225 that is open at opposite sides of the cylinder. The main wall 231 has an opening in an area overlapping the hollow portion 225. Thus, the hollow portion 225 is continuous to the outside of the main wall 231 in the first housing member 22.

With the main wall 221, the side wall 222, and the inner wall 223 having the above structures, the first housing member 22 has a space 224 defined by the main wall 221, the side wall 222, and the inner wall 223. The space 224 is annular in a plan view, and open at the side opposite to the side where the main wall 221 is located.

Moreover, the second housing member 23 includes a main wall 231 and a side wall 232. The main wall 231 is circular in a plan view. The side wall 232 is cylindrical in a plan view. The side wall 232 is cylindrical, is disposed along the outer peripheral end portion of the main wall 231, and extends in a direction perpendicular to the main surface of the main wall 231. Thus, the second housing member 23 has a space 235 defined by the main wall 231 and the side wall 232. The space 235 is circular in a plan view, and open at the side opposite to the side where the main wall 231 is located.

The main wall 231 has, at the center, the opening 234 that extends through the main wall 231 in a thickness direction. The opening 234 is continuous with the space 235 and is circular in a plan view. The profile of the opening 234 is similar to the profile of the rotor 30 in a plan view (profile viewed from the first end portion or the second end portion of the shaft 33). The opening 234 has an area provided to receive the rotor 30, for example, about the same as the plane area of the center space in the stator 40.

According to the exemplary aspect, the main wall 231 has multiple holes 236 that extend through the main wall 231 in the thickness direction, and are continuous with the space 235. The multiple holes 236 are disposed along the outer periphery of the opening 234.

According to an exemplary aspect, the first housing member 22 and the second housing member 23 are assembled together. More specifically, the first housing member 22 is disposed to have the opening of the space 224 facing the second housing member 23, and the second housing member 23 is disposed to have the opening of the space 235 facing the first housing member 22. Thus, the second housing member 23 is fitted to the first housing member 22 while having the outer wall (i.e., a peripheral surface) of the side wall 232 coming into contact with an inner wall surface 2221 of the side wall 222 of the first housing member 22.

The housing 21 thus has an internal space that is continuous with the outside of the second housing member 23 through the opening 234 and the multiple holes 236 described above.

The shaft cap member 25 is disk-shaped and has a recess 250 set back from a first main surface. The shaft cap member 25 is disposed around an end portion of the hollow portion 225 near the main wall 221.

The shaft cap member 25 has a screw groove on the outer periphery. A screw groove is formed on the wall surface of the recess 250 around the end portion near the main wall 221. Accordingly, the shaft cap member 25 is screwed on the wall surface forming the recess 250 with these screw grooves. The adjustment of this screwing state adjusts the position of the shaft cap member 25 in the axial direction of the recess 250 (i.e., the depth by which the shaft cap member 25 is embedded into the housing 21 (refer to an embedment depth HS1 in FIG. 5(A) and an embedment depth HS2 in FIG. 5(B))).

The bearing 26 is cylindrical, located in the hollow portion 225, and fixed to the wall (i.e., the peripheral surface) of the inner wall 223 facing the hollow portion 225. A structure including the bearing 26 and the inner wall 223 corresponds to "a bearing member" according to the present disclosure.

In the exemplary aspect, the attraction magnet 27 is annular and is disposed at a far end portion of the inner wall 223, in other words, at an end portion of the inner wall 223 opposite to an end portion connected to the main wall 221. The attraction magnet 27 corresponds to "an attraction-force producing member" according to the present disclosure.

In addition, the yoke 28 is annular and has a shape substantially the same as the shape of the attraction magnet 27. The yoke 28 is disposed near the far end portion of the inner wall 223, and on the side of the attraction magnet 27 closer to the main wall 221. The yoke 28 corresponds to "an attraction-force supplementary member" and "an attraction yoke" according to the present disclosure.

The stator 40 includes multiple stator cores, an insulator, and multiple coil conductors. The stator 40 is annular, and has a center space. The multiple stator cores are arranged at intervals from each other in an annular circumferential direction. The multiple coil conductors are wound around the multiple stator cores with the insulator interposed therebetween. More specifically, the multiple coil conductors are wound around the stator cores about the direction, serving as an axis, extending outward from the annular center of the stator 40.

According to the exemplary aspect, the profile of the stator 40 viewed in a plan is substantially the same as the shape of the inner wall surface 2221 of the side wall 222 of the first housing member 22, and smaller than the inner wall surface 2221. When the stator 40 is viewed in a plan view, the profile of the center space, that is, the shape of the inner end portion of the stator 40 is substantially the same as the profile of the rotor 30, described later, and larger than the profile of the rotor 30.

The stator 40 is located in the internal space in the housing 21. More specifically, the stator 40 is accommodated in the space 224 in the first housing member 22 and the space 235 in the second housing member 23. In this case, in a plan view, the center of the stator 40 and the center of the internal space in the housing 21 are substantially aligned with each other. The outer peripheral end portion of the stator 40 is located closer to, but not in contact with the inner wall surface 2221 of the side wall 222 of the first housing member 22. The position of the stator 40 with respect to the first housing member 22 is fixed by, for example, bringing leg members in the stator 40 into contact with an inner surface of the main wall 221 of the first housing member 22.

As further shown, the insulating resin 24 is disposed in the internal space in the housing 21. In this structure, the stator 40 and the housing 21 are fixed to each other with the insulating resin 24. In addition, the first housing member 22 and the second housing member 23 are fixed to each other with the insulating resin 24.

Specific Structure of Rotor 30

As illustrated in FIG. 4(A) and FIG. 4(B), the rotor 30 includes a rotor yoke 31, a magnet 32, and a shaft 33.

The rotor yoke 31 includes a body portion 311, a connection portion 312, and a shaft holding portion 313. The rotor yoke 31 can be formed from a magnetized metal, such as SUS, according to an exemplary aspect.

As further shown, the body portion 311 has a shape of a cylinder having an internal space 3110. The shape of the inner wall surface of the body portion 311 is substantially the same as the profile of the inner wall 223 of the first housing member 22, and the diameter of the inner wall surface is greater than the diameter of the profile of the inner wall 223. The body portion 311 is disposed to cover the peripheral surface of the shaft 33. More specifically, the body portion 311 is a cylindrical structure having a surface parallel to the peripheral surface of the shaft 33, and spaced at a predetermined distance apart outward from the peripheral surface of the shaft 33.

The shaft holding portion 313 has a shape of a cylinder having an internal space 3130. The shape of the inner wall surface of the shaft holding portion 313 is substantially the same as the shape of the side surface (e.g., the peripheral surface) of the shaft 33, and the diameter of the inner wall surface of the shaft holding portion 313 is the same as the diameter of the shaft 33. The shaft holding portion 313 is disposed at a first end portion of the body portion 311 in the axial direction. At this time, the center axis of the shaft holding portion 313 and the center axis of the body portion 311 are aligned with each other. The shaft holding portion 313 holds the shaft 33.

The connection portion 312 is an annular flat board, and has a flat surface perpendicular to the axial direction of the body portion 311 and the shaft holding portion 313. In other words, the connection portion 312 has a flat surface perpendicular to the axial direction of the shaft 33 (i.e., the direction in which the shaft 33 extends). The connection portion 312 connects the body portion 311 and the shaft holding portion 313 to each other.

The magnet 32 is annular and is disposed along the outer surface of the body portion 311 of the rotor yoke 31.

The shaft 33 is a cylinder. The shaft 33 is inserted into the internal space 3110 of the body portion 311, and fitted to the internal space 3130 of the shaft holding portion 313. As further shown, the first end portion of the shaft 33 protrudes outward beyond the body portion 311.

Specific Positional Relationship Between Stator Assy 20 and Rotor 30

As illustrated in FIG. 2, the rotor 30 is inserted into and supported by the stator assy 20. More specifically, the rotor 30 is inserted into the stator assy 20 through the opening 234 to have the opening of the body portion 311 of the rotor yoke 31 located closer to the main wall 221 of the first housing member 22 of the stator assy 20. Then, the rotor yoke 31 covers the inner wall 223 of the first housing member 22 in the stator assy 20 while being spaced apart from the inner wall 223.

The shaft 33 extends through the bearing 26, and has a first end portion (e.g., an end portion opposite to the end portion held by the rotor yoke 31) in contact with the shaft cap member 25. The magnet 32 of the rotor 30 is located near the stator core of the stator 40 in the stator assy 20.

In this state, by controlling a current supplied to the multiple coil conductors of the stator 40, the brushless motor 10 can control the rotations of the rotor 30.

Structure of Preventing Thrusting Motions of Rotor 30

FIG. 5(A) and FIG. 5(B) are enlarged views of a portion around the rotor and the stator. As illustrated in FIG. 5(A), FIG. 5(B), and FIG. 2, in the brushless motor 10, the attraction magnet 27 faces the connection portion 312 of the rotor yoke 31 and is located near the connection portion 312. Thus, a magnetic attraction force occurs between the connection portion 312 of the rotor yoke 31 and the attraction magnet 27, and the rotor yoke 31 is attracted toward the main wall 221 of the stator assy 20.

In this structure, the connection portion 312 of the rotor yoke 31 and the attraction magnet 27 face each other over a predetermined area, and thus a strong magnetic attraction force occurs. Accordingly, this structure is configured to prevent a thrusting motion of the rotor 30.

In the brushless motor 10, the yoke 28 is disposed on a side of the attraction magnet 27 opposite to the side where the connection portion 312 of the rotor yoke 31 is located. This structure further enhances (e.g., supplements) the magnetic attraction force occurring between the attraction magnet 27 and the connection portion 312 of the rotor yoke 31. This structure thus is configured to prevent a thrusting motion of the rotor 30 without increasing the attraction magnet 27. In other words, this structure reduces the size of the brushless motor 10 while a thrusting motion of the rotor 30 is prevented. This structure can also reduce the size of the rotor yoke 31. Thus, the inner-rotor-type brushless motor 10 where the rotor 30 is located on the inner side of the stator 40 can be easily and more reliably formed.

As compared with conventional motor structures, in this structure, a member disposed at the end portion of the shaft 33 that is not an attraction magnet, that is, the shaft cap member 25 in the brushless motor 10 enables size reduction. As such, this structure enables size reduction of the stator assy 20, and size reduction of the brushless motor 10.

In the brushless motor 10, the main direction of the magnetic field of the magnet 32 for producing the rotational force is substantially perpendicular to the main direction of the magnetic field of the attraction magnet 27. This structure thus prevents the magnetic field produced by the attraction magnet 27 from adversely affecting the occurrence of the rotational force.

As illustrated in FIG. 5(A) and FIG. 5(B), in the brushless motor 10, the position of the shaft cap member 25 can be moved in the axial direction of the shaft 33. In other words, the brushless motor 10 is configured to adjust the depth by which the shaft cap member 25 is embedded from the outer surface of the main wall 221 of the housing 21 (i.e., the embedment depth HS1 in FIG. 5(A) and the embedment depth HS2 in FIG. 5(B)).

As illustrated in FIG. 5(A) and FIG. 5(B), the distance between the attraction magnet 27 and the connection portion 312 of the rotor yoke 31 (i.e., a distance D1 in FIG. 5(A) and a distance D2 in FIG. 5(B)) can be adjusted in this manner. Thus, the magnitude of the magnetic attraction force occurring between the attraction magnet 27 and the connection portion 312 of the rotor yoke 31 can be adjusted.

Figure 6:
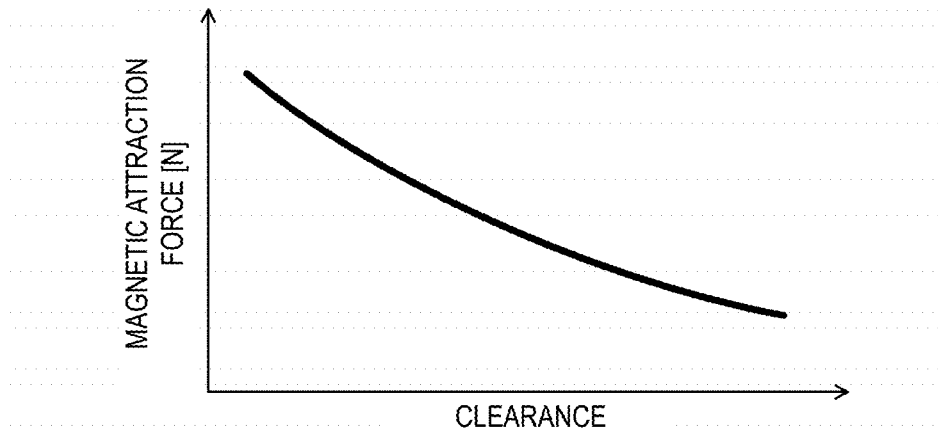
FIG. 6 is a graph of the relationship between a clearance between the rotor 30 and the stator 40 and a magnetic attraction force.

FIG. 6 is a graph illustrating the relationship between a clearance between the rotor 30 and the stator 40 and the magnetic attraction force. The clearance in FIG. 6 is a distance corresponding to, for example, the distance D1 or D2, and a clearance between the rotor 30 and the stator assy 20 in the axial direction. As illustrated in FIG. 6, adjusting the clearance can adjust the magnetic attraction force between the rotor 30 and the stator assy 20 in the axial direction. Particularly, this structure is configured to adjust the clearance to any of continuous values, and the magnetic attraction force to any of continuous values.

Thus, for example, regardless of whether each component included in the brushless motor 10 has a manufacture error, the distance between the attraction magnet 27 and the connection portion 312 of the rotor yoke 31 can be adjusted to achieve an optimal magnetic attraction force. This structure thus eliminates the need of an attraction magnet larger than necessary, and enables size reduction of the brushless motor 10.

In the brushless motor 10 according to the exemplary aspect, the shaft cap member 25 does not protrude from the housing 21. This structure eliminates the need of the brushless motor 10 with a profile larger than necessary.

Moreover, the position of the shaft cap member 25 is adjusted by screwing, and thus can be finely adjusted. This structure thus more reliably forms an optimal magnetic attraction force.

In the brushless motor 10, the attraction magnet 27 is annular. This structure thus reduces the variation of the size of the magnetic field in the peripheral direction of the rotor 30. In other words, the attraction magnet 27 in the brushless motor 10 is discretely disposed in the peripheral direction of the rotor 30, or not disposed simply at a specific position in the peripheral direction. Thus, the magnetic force can be uniformized omnidirectionally about the center axis of the rotor 30. This structure can thus reduce, for example, inclination of the rotor 30.

As illustrated in FIG. 2, FIG. 5(A), and FIG. 5(B), in the brushless motor 10, the attraction magnet 27 and the yoke 28 are fitted into a recess 2230 formed at the far end portion of the inner wall 223. This structure eliminates the need of providing an area where the attraction magnet 27 and the yoke 28 are attached, separate from the inner wall 223, and thus enables size reduction of the brushless motor 10. Particularly, the use of the yoke 28 eliminates the need of the attraction magnet 27 larger than necessary, and thus achieves a structure where the attraction magnet 27 and the yoke 28 do not protrude from the peripheral surface of the inner wall 223. This structure enables further size reduction of the brushless motor 10.

Method for Manufacturing Brushless Motor 10

Figure 7:
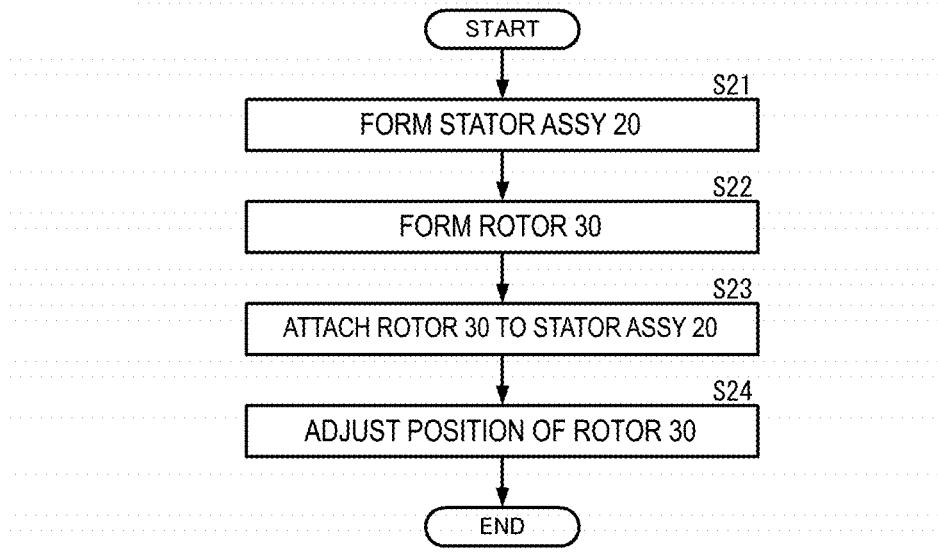
FIG. 7 is a flowchart of an example of a method for manufacturing the brushless motor 10 according to an exemplary embodiment.

The brushless motor 10 with the above structure can be manufactured by, for example, the following method. FIG. 7 is a flowchart of an example of a method for manufacturing a brushless motor according to an exemplary embodiment.

As illustrated in FIG. 7, first, the stator assy 20 and the rotor 30 are individually formed (S21 and S22). Subsequently, the rotor 30 is attached to the stator assy 20 (S23). Subsequently, the position of the rotor 30 is adjusted with the shaft cap member 25 (S24).

Application Example of Brushless Motor 10

Figure 8:
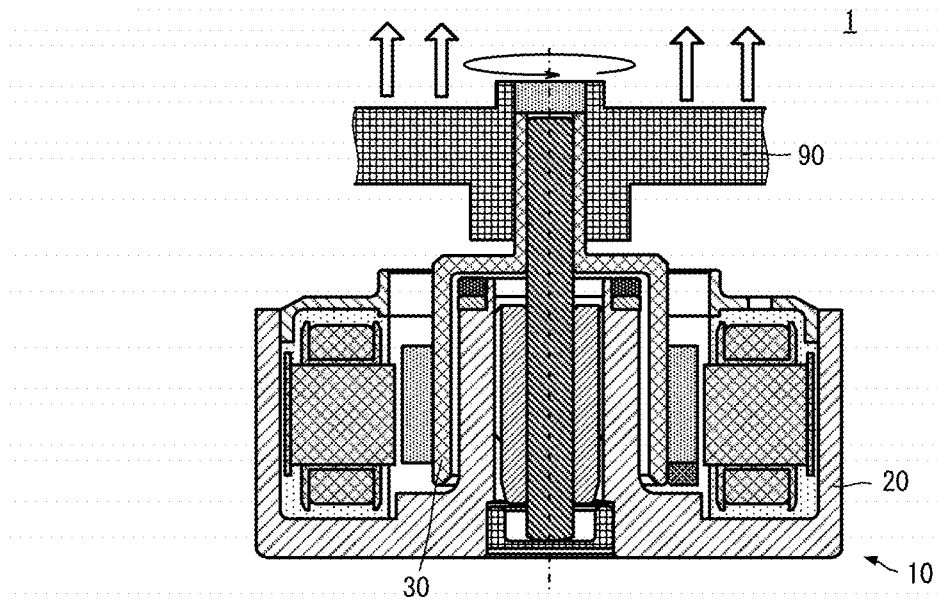
FIG. 8 is a sectional view, viewed from a side, of a structure example of a pump 1, which is an application example of the brushless motor 10 according to an exemplary aspect.

FIG. 8 is a sectional view, viewed from a side, of a structure example of a pump 1, which is an application example of the brushless motor 10 according to the present invention. As illustrated in FIG. 8, the pump 1 includes a brushless motor 10 and an impeller 90. The impeller 90 is fixed to the rotor 30.

Depending on the purpose of use, the impeller 90 in the pump 1 needs to be rotated at a high speed. When the impeller 90 rotates at a high speed, the force that causes a thrusting motion of the rotor 30 increases.

However, the use of the structure of the brushless motor 10 can more reliably reduce the thrusting motion of the rotor 30. In addition, the use of the structure of the brushless motor 10 reduces its size and reduce the size of the pump 1.

Figure 9:
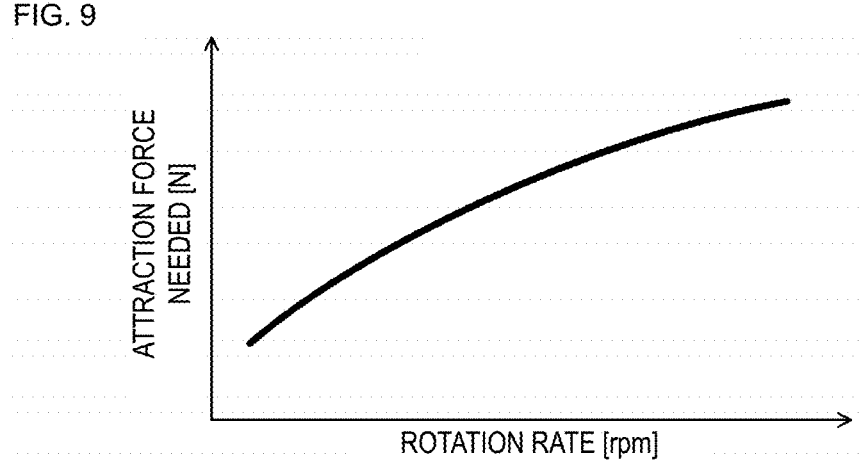
FIG. 9 is a graph of a change of an attraction force used between the rotor 30 and the stator 40 with respect to the rotation rate of an impeller 90.

Depending on the purpose of use, the rotation rate of the impeller 90 may be set to a different value. FIG. 9 is a graph of a change of an attraction force needed between the rotor 30 and the stator 40 with respect to the rotation rate of the impeller 90. As illustrated in FIG. 9, when the rotation rate (e.g., rotation speed) changes, the attraction force needed also changes.

However, the use of the structure of the brushless motor 10 can adjust the clearance between the rotor 30 and the stator assy 20 in the axial direction, and thus can adjust the magnetic attraction force between the rotor 30 and the stator assy 20 in the axial direction. Thus, the positional relationship between the rotor 30 and the stator assy 20 in the axial direction can be adjusted to cause a magnetic attraction force appropriate for the attraction force needed.

In the present embodiment, the pump 1 is described as an example. However, the structure of the brushless motor 10 according to the present invention is applicable to any device that uses high-speed rotations of the rotor 30. In addition, the structure of the brushless motor 10 according to the present invention is applicable to any device that needs adjustment of rotations of the rotor 30.

REFERENCE SIGNS LIST 1 pump
10 brushless motor
20 stator assy
21 housing
22 first housing member
23 second housing member
24 insulating resin
25 shaft cap member
26 bearing
27 attraction magnet
28 yoke
30 rotor
31 rotor yoke
32 magnet
33 shaft
40 stator
90 impeller

The invention claimed is:
1. A brushless motor, comprising:
 a rotor including:
  a shaft,
  a rotor yoke configured to hold the shaft and that covers a peripheral surface of the shaft, and
  a magnet disposed around an outer periphery of the rotor yoke;
 a stator disposed around an outer periphery of the rotor;
 a bearing member configured to rotatably hold the shaft;
 an attraction-force producing member that is disposed at an end of the bearing member at which the rotor yoke holds the shaft, and that is configured to produce an attraction force to attract the rotor yoke;

an attraction-force supplementary member configured to supplement the attraction force; and a position adjusting member that is in contact with an end of the shaft that is opposite to an end held by the rotor yoke, and that is configured to adjust a position of the rotor in an axial direction of the shaft.

2. The brushless motor according to claim 1, wherein the attraction-force producing member is an attraction magnet that faces the rotor yoke, and wherein the attraction-force supplementary member is an attraction yoke disposed on a side of the attraction magnet opposite to a side of the rotor yoke.

3. The brushless motor according to claim 2, wherein the rotor yoke includes:

a cylindrical body that is parallel to the peripheral surface of the shaft, a holding portion that holds the shaft, and a connection portion that connects the body to the holding portion and extends perpendicular to a direction in which the shaft extends.

4. The brushless motor according to claim 3, wherein the attraction magnet faces the connection portion.

5. The brushless motor according to claim 4, wherein the attraction magnet and the attraction yoke each have an annular shape.

6. The brushless motor according to claim 1, further comprising:

a housing that surrounds the stator, wherein the position adjusting member is screwed to the housing.

7. The brushless motor according to claim 6, wherein the position adjusting member is disposed on an inner side of the housing.

8. The brushless motor according to claim 6, wherein a main wall of the housing that extends in a direction perpendicular to the axial direction of the shaft has a plurality of holes that extend there through.

9. The brushless motor according to claim 6, wherein the stator is fixed to the housing with an insulating resin.

10. The brushless motor according to claim 1, wherein the stator is fixed to a housing with an insulating resin.

11. A brushless motor, comprising:

a stator assy having an opening;

a rotor inserted into the stator assy through the opening and including a shaft, a rotor yoke covering a peripheral surface of the shaft, and a magnet disposed on a surface of the rotor yoke;

a stator disposed around the rotor;

a bearing member configured to rotatably hold the shaft;

an attraction-force producing member that is disposed at an end of the bearing member at which the rotor yoke holds the shaft, and that is configured to produce an attraction force to attract the rotor yoke; and a position adjusting member that is in contact with an end of the shaft that is opposite to an end held by the rotor yoke, and that is configured to adjust a position of the rotor in an axial direction of the shaft.

12. The brushless motor according to claim 11, further comprising an attraction-force supplementary member configured to supplement the attraction force.

13. The brushless motor according to claim 12, wherein the attraction-force producing member is an attraction magnet that faces the rotor yoke, and wherein the attraction-force supplementary member is an attraction yoke disposed on a side of the attraction magnet opposite to a side of the rotor yoke.

14. The brushless motor according to claim 13, wherein the rotor yoke includes:

a cylindrical body that is parallel to the peripheral surface of the shaft, a holding portion that holds the shaft, and a connection portion that connects the body to the holding portion and extends perpendicular to a direction in which the shaft extends, wherein the attraction magnet faces the connection portion.

15. The brushless motor according to claim 14, wherein the attraction magnet and the attraction yoke each have an annular shape.

16. The brushless motor according to claim 11, further comprising:

a housing that surrounds the stator, wherein the position adjusting member is screwed to the housing.

17. The brushless motor according to claim 16, wherein the position adjusting member is disposed on an inner side of the housing.

18. The brushless motor according to claim 16, wherein a main wall of the housing that extends in a direction perpendicular to the axial direction of the shaft has a plurality of holes that extend therethrough.

* * * * *